(12) United States Patent
Kandal et al.

(10) Patent No.: US 12,462,572 B2
(45) Date of Patent: Nov. 4, 2025

(54) METHOD AND SYSTEM FOR GATHERING IMAGE TRAINING DATA FOR A MACHINE LEARNING MODEL

(71) Applicant: GRABTAXI HOLDINGS PTE. LTD., Singapore (SG)

(72) Inventors: Philipp Wolfgang Josef Kandal, Singapore (SG); Chen Liang, Singapore (SG); Adrian Ioan Margin, Cluj-Napoca (RO); Hannes Martin Kruppa, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 12 days.

(21) Appl. No.: 18/279,730

(22) PCT Filed: May 10, 2022

(86) PCT No.: PCT/SG2022/050290
§ 371 (c)(1),
(2) Date: Sep. 1, 2023

(87) PCT Pub. No.: WO2022/271084
PCT Pub. Date: Dec. 29, 2022

(65) Prior Publication Data
US 2024/0135718 A1  Apr. 25, 2024
US 2024/0233389 A9  Jul. 11, 2024

(30) Foreign Application Priority Data
Jun. 22, 2021  (SG) .......................... 10202106802U (51) Int. Cl.
G06V 20/56  (2022.01)
G01C 21/00  (2006.01)
(Continued)

(52) U.S. Cl.
CPC ......... *G06V 20/56* (2022.01); *G01C 21/3848* (2020.08); *G06V 20/53* (2022.01);
(Continued)

(58) Field of Classification Search
None
See application file for complete search history.

(56) References Cited

U.S. PATENT DOCUMENTS 10,406,981 B2 * 9/2019 Chundrlik, Jr. ......... G01S 19/39
10,503,174 B1 * 12/2019 Kim ....................... G06T 7/521
(Continued)

FOREIGN PATENT DOCUMENTS

CA 3067177 A1 * 8/2018 ......... G08G 1/09623
CA 3148040 A1 * 1/2021 .............. H04W 8/20
(Continued)

OTHER PUBLICATIONS

International Search Report and Written Opinion dated Sep. 23, 2022 which was issued in connection with PCT/SG2022/050290.
(Continued)

*Primary Examiner* — Ricky Chin
(74) *Attorney, Agent, or Firm* — Buckley, Maschoff & Talwalkar LLC (57) ABSTRACT

Aspects concern a method for gathering image training data for training a machine learning model to detect features for vehicle navigation or vehicle control, comprising mounting a camera onto a vehicle or the driver of a vehicle, determining a location of the vehicle, determining a relevancy of the determined location for map data generation or vehicle control and recording a video with the camera if the determined relevancy is above a predetermined threshold and recording single images if the determined relevancy is below the predetermined threshold.

16 Claims, 4 Drawing Sheets (51) Int. Cl.
  *G06V 20/52* (2022.01)
  *G06V 20/54* (2022.01)
  *G06V 20/70* (2022.01)
  *H04N 7/01* (2006.01)
(52) U.S. Cl.
  CPC .............. *G06V 20/54* (2022.01); *G06V 20/70* (2022.01); *H04N 7/013* (2013.01)

(56) References Cited

U.S. PATENT DOCUMENTS

| | | | |
|---|---|---|---|
| 10,733,460 B2* | 8/2020 | Heck | G06V 20/58 |
| 11,441,916 B1* | 9/2022 | Konrardy | G01C 21/343 |
| 2008/0240513 A1 | 10/2008 | Xie et al. | |
| 2017/0069205 A1* | 3/2017 | Nguyen | G08G 1/096775 |
| 2017/0307746 A1* | 10/2017 | Rohani | G01S 13/865 |
| 2018/0001890 A1* | 1/2018 | Ratcliffe | B60W 50/14 |
| 2018/0053108 A1 | 2/2018 | Olabiyi | |
| 2018/0272963 A1* | 9/2018 | Meyhofer | B60W 50/023 |
| 2019/0371170 A1* | 12/2019 | Song | G05D 1/0088 |
| 2020/0208994 A1 | 7/2020 | Askeland | |
| 2020/0225669 A1* | 7/2020 | Silva | G01S 17/06 |
| 2020/0317216 A1* | 10/2020 | Konrardy | B60W 30/182 |
| 2021/0200210 A1* | 7/2021 | Gil | G05D 1/0088 |
| 2022/0114888 A1* | 4/2022 | Napanda | G08G 1/0112 |
| 2023/0294729 A1* | 9/2023 | Danziger | G06V 20/58 701/23 |
| 2024/0135718 A1* | 4/2024 | Kandal | G01C 21/28 |
| 2024/0233389 A9* | 7/2024 | Kandal | G01C 21/28 |

FOREIGN PATENT DOCUMENTS

| | | | | |
|---|---|---|---|---|
| CA | 3057924 A1 | * | 4/2021 | |
| CA | 3120287 A1 | * | 1/2022 | .............. G06N 7/01 |
| CN | 1880918 | | 12/2006 | |
| CN | 110832474 A | * | 2/2020 | ............. G06V 10/75 |
| DE | 102021001043 A1 | * | 4/2021 | ............. G01S 7/497 |
| JP | 6550117 B2 | * | 7/2019 | ........... B60W 40/06 |
| KR | 20220031685 A | * | 3/2022 | ............. G06T 7/136 |
| WO | WO-2020205655 A1 | * | 10/2020 | ............ G06N 20/00 |

OTHER PUBLICATIONS

Hunter: How Carmera Processes Mapping Data Captured From Autonomous Vehicles. Jun. 1, 2020 [Retrieved on Aug. 30, 2022 from https://builtin.com/artificial-intelligence/high- quantity-data-management) How Carmera optimizes its data management- and spending, Question two: How can we get more from less?

Wang: How DeepMap optimizes their video inference workflow with Amazon SageMaker Processing. Nov. 20, 2020 [Retrieved on Aug. 30, 2022 from https://aws.amazon.com/blogs/machine- learning/how-deepmap-optimizes-their-video-inference-workflow-with-amazon-sagemaker-processing/] Whole document especially Video processing.

Supplemental European Search Report and Written Opinion dated Aug. 27, 2024 which was issued in connection with EP 22 82 8873.

* cited by examiner

FIG 3

METHOD AND SYSTEM FOR GATHERING IMAGE TRAINING DATA FOR A MACHINE LEARNING MODEL

TECHNICAL FIELD

The present invention is a 371 of International Application No. PCT/SG2022/050290, filed on May 10, 2022, and claiming priority to Singapore Application No. 10202106802U filed on Jun. 22, 2021, incorporated by reference herein in its entirety.

BACKGROUND

The quality of an e-hailing service which enables customers to hail taxis using their smartphones largely depends on the underlying map data which is for example used for estimating the time when the driver will be there to pick up the user, a price of the ride and how long it will take to get to the destination. Machine learning models may be used to automatically generate map data from images, e.g. to recognize points of interest, street names, etc. However, for having a machine learning model that may reliably process images for map data generation, training images are necessary for training the machine learning models.

Another application for machine learning models operating on images is autonomous driving which has enormous potential, not only economically, but also to improve mobility, allow more efficient usage of roads and allow reducing carbon emissions. Since controlling a vehicle autonomously is a complicated task, machine learning methods are being developed which derive control signals for vehicles from various sensor data which include, in particular, image data, because images of a vehicles surroundings include a lot of information relevant for the vehicle control, such as present of obstacles, direction of the road, traffic signs etc. For example, convolutional neural networks may be used to process images of a vehicle's surroundings and results of the processing may, among others such as radar, vehicle-to-vehicle communication etc. be used as a basis for the vehicle control. Results of such a processing may for example also be used for vehicle navigation. Again, for achieving a high performance of vehicle control (or navigation etc.), the machine learning model which is used must be trained properly.

Thus, a high amount of suitable training data for machine learning models trained for image processing (e.g. convolutional neural networks used for obstacle, point of interest or traffic sign recognition) are required.

Accordingly, efficient methods for obtaining image training data for machine learning for vehicle control are desirable.

SUMMARY

Various embodiments concern a method for gathering image training data for training a machine learning model to detect features for vehicle navigation or vehicle control, comprising mounting a camera onto a vehicle or the driver of a vehicle, determining a location of the vehicle, determining a relevancy of the determined location for map data generation or vehicle control and recording a video with the camera if the determined relevancy is above a predetermined threshold and recording single images if the determined relevancy is below the predetermined threshold.

According to one embodiment, the relevancy is determined based on map data specifying whether location belongs to an urban area or a rural area.

According to one embodiment, the relevancy is determined to be higher when the vehicle is located in an urban area and is determined to be lower when the vehicle is located in a rural area.

According to one embodiment, the predetermined threshold is set such that the relevancy of an urban area is above the predetermined threshold and the relevancy of a rural area is below the predetermined threshold.

According to one embodiment, the relevancy of a location is determined to be either high or low and the method comprises recording a video with the camera if the determined relevancy is high and recording single images if the determined relevancy is low.

According to one embodiment, the camera comprises a video mode and a single image mode and the method comprises switching the camera to video mode if the determined relevancy is above the predetermined threshold and switching the camera to single image mode if the determined relevancy is below the predetermined threshold.

According to one embodiment, the method comprises setting a frame rate of the recording of the video or a rate of recording single images depending on the determined relevancy.

According to one embodiment, the method comprises determining the relevancy of the determined location depending on population density of the location, such that the determined relevancy is the higher the higher the population is at the location.

According to one embodiment, the method comprises determining the relevancy of the determined location depending on traffic at the location, such that the determined relevancy is the higher the higher the population is at the location.

According to one embodiment, the method comprises storing and uploading the recorded video or single images.

According to one embodiment, the method comprises storing the recorded video or single images, determining a value of the recorded video or single images for training the machine learning model and uploading the recorded video and single images if the value is above a predetermined threshold.

According to one embodiment, the method comprises storing the recorded video or single images and uploading the recorded video or single images to a remote component in response to the reception of a request for training data from the remote component.

According to one embodiment, the method comprises labelling the recorded video or single images with a specification of the determined location before uploading.

According to one embodiment, the method comprises determining the relevancy of the determined location by consulting relevancy data which indicates relevant areas.

According to one embodiment, an image recording arrangement of a vehicle is provided comprising a camera, a positioning device configured to determine a location of the vehicle and a camera controller configured to determine a relevancy of the determined location for map data generation or vehicle control and configured to control the camera to record a video if the determined relevancy is above a predetermined threshold and to record single images if the determined relevancy is below the predetermined threshold.

According to one embodiment, a computer program element is provided comprising program instructions, which, when executed by one or more processors, cause the one or more processors to perform the method for gathering image training data for a machine learning model described above.

According to one embodiment, a computer-readable medium is provided comprising program instructions, which, when executed by one or more processors, cause the one or more processors to perform the method for gathering image training data for a machine learning model.

It should be noted that embodiments described in context of the method are analogously valid for the method for the image recording arrangement and vice versa.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
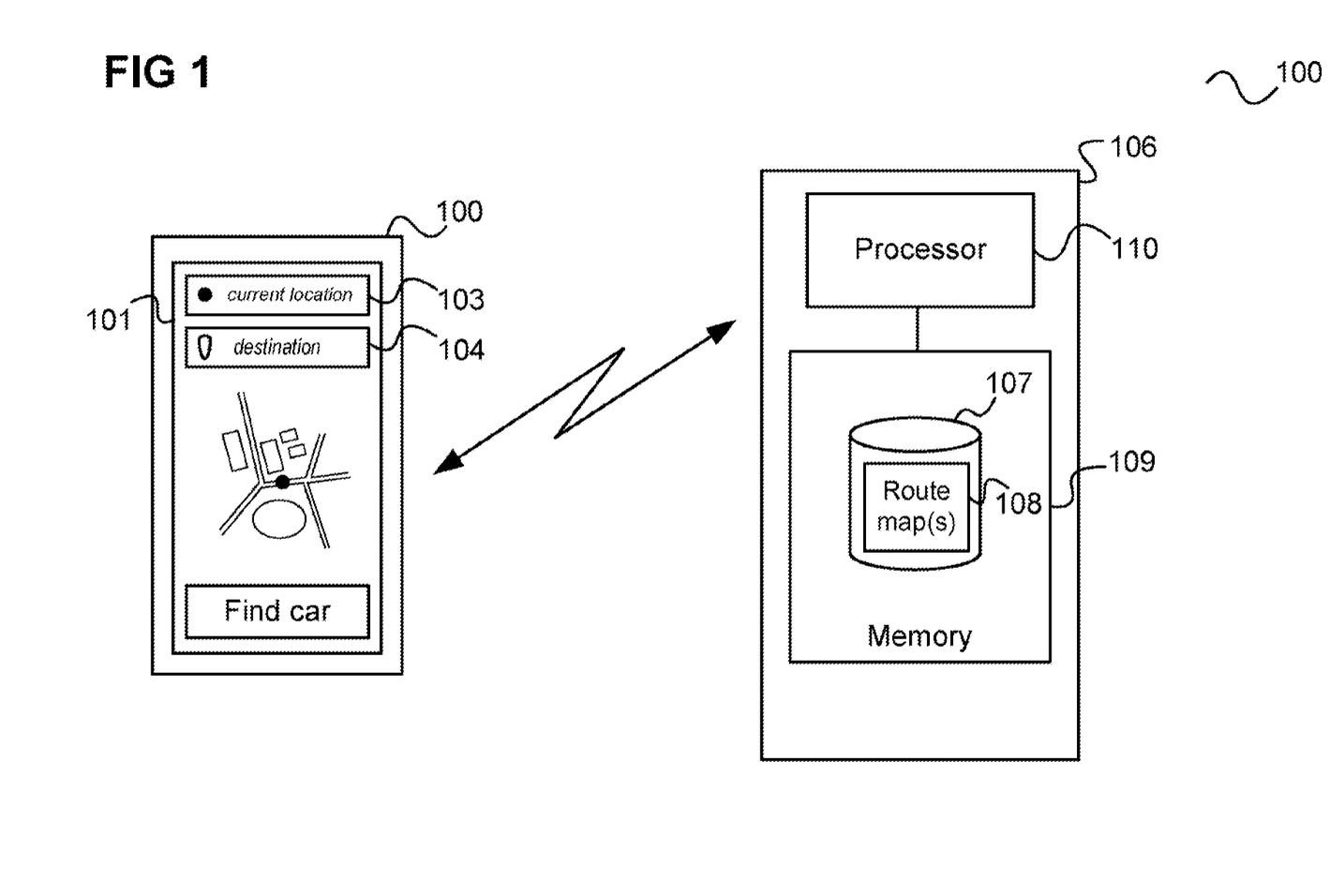
FIG. 1 shows a communication arrangement including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the user's vicinity (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 includes a database 107 knowing the current location of registered drivers, when they are expected to be free, has information about traffic jams etc. From this, a processor 110 of the server 106 determines the most suitable driver (if available) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button.

To determine all route-related information, like the most suitable driver and an estimate of the time when the driver will be there to pick up the user, a price of the ride and how long it will take to get to the destination, the processor 110 accesses the data base 107 which stores map data 108 including for example one or more road maps indicating where roads are located, the allowed direction of travel, speed limits, etc.

The data base 107 is in this example implemented by a local memory 109 of the server computer 106. However, it may also be implemented at least partially externally to the server computer 106, e.g. in a cloud. It should be noted while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

For determination of information like described above the map data 108 should be up to date, free of errors and complete. The server 106 may for example use a neural network to process the image data for map (data) generation, i.e. mapping. For being able to correctly derive information from the image data, the neural network needs to be trained using training data, i.e. training data images.

Another application for a machine learning model trained with image data is autonomous driving as described in the following with reference to FIG. 2.

Figure 2:
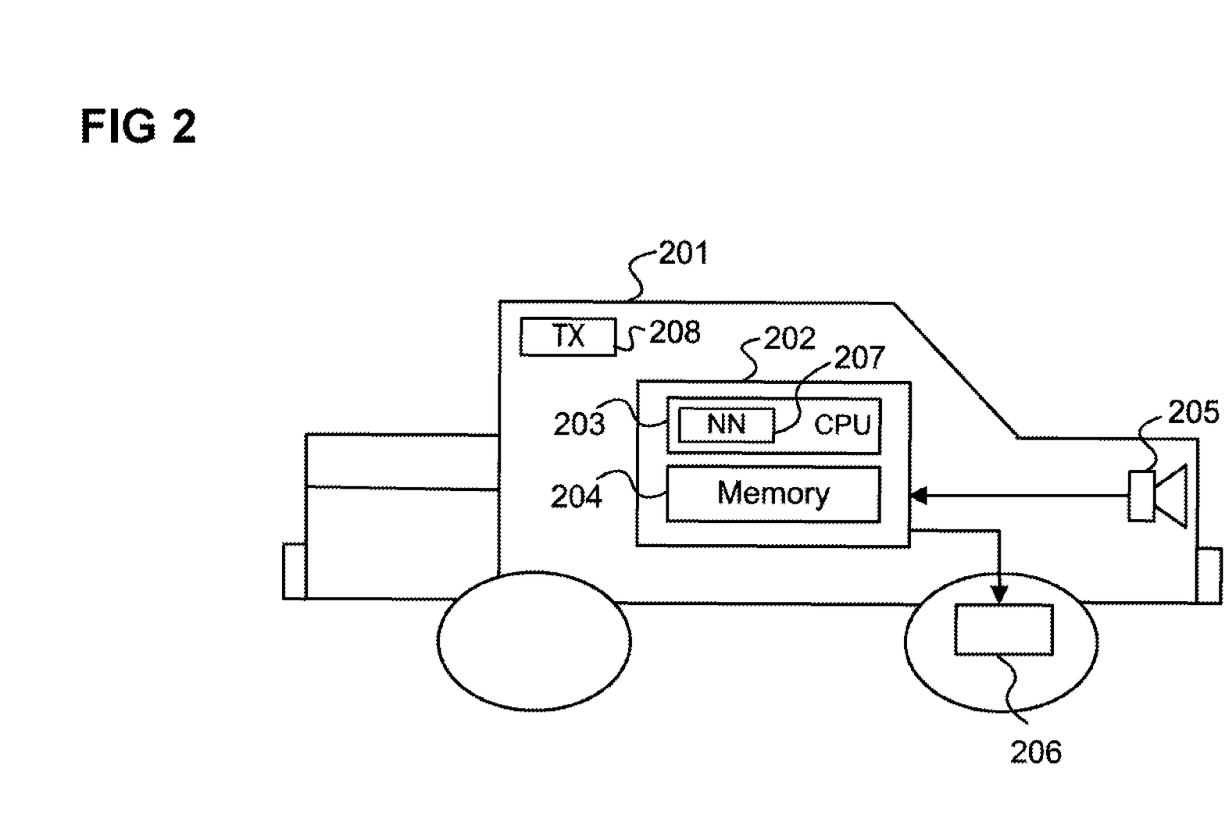
FIG. 2 shows a vehicle.

FIG. 2 shows a vehicle 201.

In the example of FIG. 2, a vehicle 201, for example a car or truck, is provided with a vehicle control device 202.

The vehicle control device 202 has data processing components, such as a processor (e.g., a CPU (central processing unit)) 203 and a memory 204 for storing control software according to which the vehicle control device 202 operates and data processed by the processor 203.

For example, the stored control software (computer program) has instructions that, when executed by the processor, cause the processor 203 to implement one or more neural networks 207, for example a convolutional neural network to process images.

The data stored in the memory 204 may include, for example, image data captured by one or more cameras 205. For example, the one or more cameras 205 may capture one or more greyscale or colour photographs of the environment surrounding the vehicle 201.

The vehicle control device 202 may use the image data (or data from other sources of information, such as other types of sensors or even vehicle-to-vehicle communication) to detect objects in the environment of the vehicle 201, particularly other vehicles and traffic signs. It may also recognize street names or locations (points of interests) for navigation, generation of maps, etc.

The vehicle control device 202 may examine the image data and control the vehicle 201 according to the results, i.e., determine control actions for the vehicle and signal them to respective actuators of the vehicle. For example, the vehicle control device 202 may control an actuator 206 (e.g., a brake) to control the speed of the vehicle, e.g., to brake the vehicle, when it recognizes an obstacle in front of the vehicle 201. The vehicle control device 202 may also derive (and for example display) navigational data or map data from the image processing and control the vehicle accordingly.

The vehicle control device 202 uses the neural network 207 to process the image data. For being able to correctly derive information from the image data, the neural network 207 needs to be trained using training data, i.e. training data images.

Vehicles such as the vehicle 201 itself may be used to collect training data images by driving around and taking images with the camera 205 (for a machine learning model used for autonomous driving or also for generation of map data, e.g. for an e-hailing service, as described above with reference to FIG. 1). It should be noted that in such as case, the camera 205 may also be a camera of a vehicle 201 that does not have a vehicle control device 202 as described, i.e. does not use image data gathered by the camera 205 for autonomous driving, but is (only) used to gather images for usage as training data images. For this, the camera 205 may for example be installed on a motor bike, in particular the helmet of the driver of a motor bike etc. Furthermore, a vehicle may have more than one camera 205 to gather images. The vehicle 201 may in particular be one of the vehicles of the e-hailing service described with reference to FIG. 1.

When a vehicle 201 has gathered an image, this image may be uploaded by the vehicle, e.g. by a wireless communication module 208 using a cellular mobile communication network (e.g. 4G) which is connected to the camera 205, e.g. via the vehicle controller 202 (which may not necessarily be for autonomous driving in case the vehicle 201 is used for collection of training data images).

Taking the images and uploading the images leads to costs. For example, drivers are paid for images and the storage of and upload of images causes costs. Therefore, it is important that training data images are efficiently gathered, e.g. that they are not redundant, they contain as much details as possible (ideally details or features that are not present in other ones of the training images) etc. Cameras with a wide view angle may for example be used to increase the chances of capturing features improving the training of the respective machine learning model.

When considering one vehicle 201 collecting images along a route in a training image gathering run, there are thus two opposing goals:
a) Reduce the size of the image data recorded by the vehicle as upload/storage of the image data is costly (e.g. in terms of mobile communication resources)
b) Record as many details as possible in the images which are taken by the vehicle in the run, because sending another vehicle to take images of the same area, e.g. on the same route, to capture details that were missing in the first run is also costly Images may for example be collected using an action (map-making) camera recording an image every 2-3 seconds. This results in data rates of 20-25 GB/hour and thus high transmission and storage requirements.

According to various embodiments, an approach for gathering image training data is provided that allows achieving a much smaller data rate (5-10 GB/hour) while still being able to capture the same (or even a higher) amount of details and achieving the same (or even better) coverage (e.g. in terms of the features, objects, etc. captured).

For this, according to various embodiments, a camera controller is provided which controls the recording of a camera. This may for example be implemented by the vehicle controller 202 (not necessarily configured for autonomous driving in that case) which is configured to control the recording of images by the camera 105.

Figure 3:
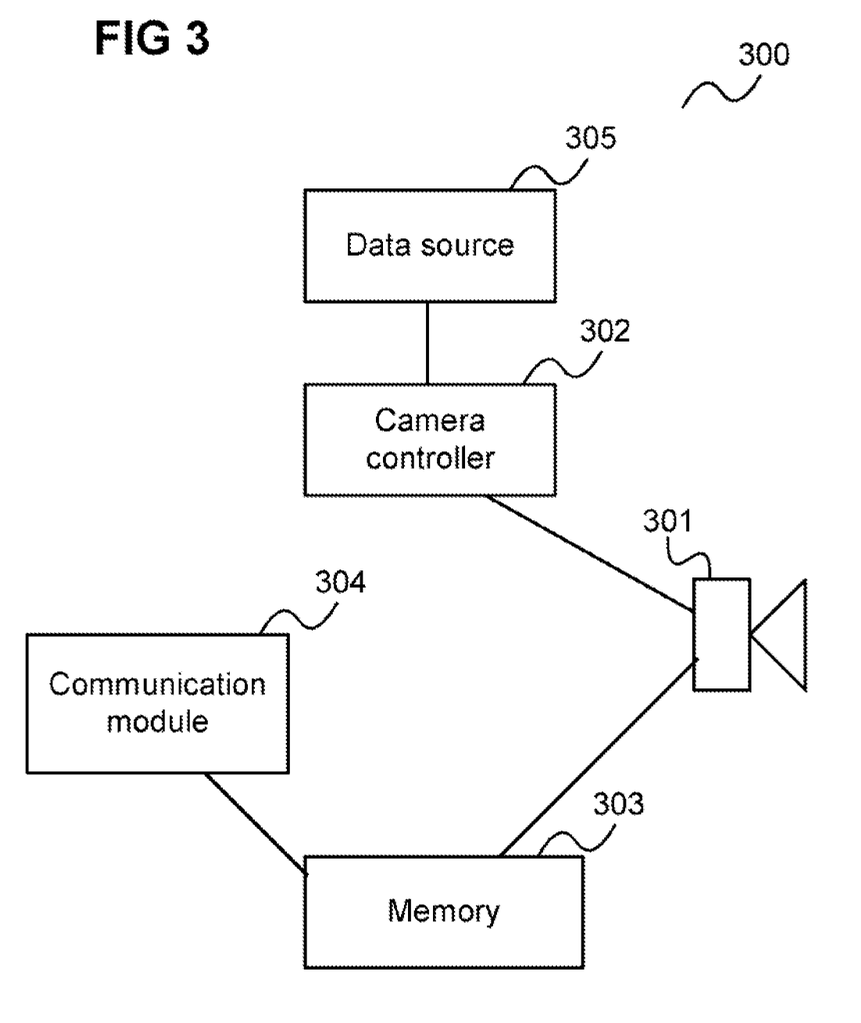
FIG. 3 shows an image recording arrangement.

FIG. 3 shows an image recording arrangement 300.

The image recording arrangement 300 comprises a camera 301, e.g. corresponding to camera 105, a camera controller 302, a memory 303 and a radio communication (in particular transmission) module 304. The camera controller 302 is configured to control the recording of images by the camera 301. Under the control of the camera controller 302, the camera 301 records images and stores them in the memory 303. The radio communication module 304 may upload the images from memory 303.

There may be a further controller which controls the upload of images stored in the memory 303. This further controller may for example be implemented by a larger control device (e.g. vehicle controller 202) which also implements the camera controller 302.

The camera controller 302 may also be a controller of the camera 301 itself, i.e. the camera controller 302 and the camera 301 are a single device (i.e. are in the same housing). For example, the camera controller 302 may be implemented by a corresponding configuration of the firmware of a camera (device), such as an action camera.

The camera 301 may for example be an embedded camera sensor, an action camera etc.

There may be multiple cameras 301. The camera 301 is for example mounted on a vehicle or on the driver of a vehicle (e.g. at the driver's helmet).

According to various embodiments, the camera controller 302 is configured to control the camera 301 (and in particular to trigger recoding of images by the camera) using data from a data source 305 which may include one or more sensors, a positioning device, a data base etc.

For example, according to various embodiments, the camera controller 302 does not control the camera 301 to record images in fixed time intervals, but mainly triggers recording of images by one or more of the following information:
Distance (i.e. record one image every 5 meters, measured using GPS)

Gyroscope/Accelerometer (i.e. record an image if the viewport changes, i.e. new features might be visible)

Trigger by scene recognition/image quality assessment (e.g. trigger based on relevant features)

Accordingly, the data source 305 may include a positioning device for measuring distance, a gyroscope and/or a processing device for performing scene recognition.

This approach allows recording much less frequently if e.g. standing still at a traffic light—or moving very slow in traffic, and record at higher frequency if either moving very fast, or if the user turns his head (e.g. in case the camera 301 is mounted on the top of the helmet).

Thus, according to various embodiments, rather than using a time-based capturing method, more logic is used so that the camera recording is triggered based on other factors than time (such as GPS (distance), Gyro/Accelerometer (viewport) and relevancy of the camera's location).

According to various embodiments, the camera controller 302 controls the camera 301 to

- Record an image only if a feature has changed (e.g. new building, road, and traffic sign) in comparison to a baseline (i.e. reference) map, e.g. stored in the data source 305 (which may include a memory). This means that only changes get detected and uploaded and applies in particular to generate training images for map data generation.
- Record at specific locations that are critical for map generation (e.g. increase frequency close to an intersection, given intersection are most likely to have important traffic signs such as turn restrictions)
- Frame Rate adjustment based on interesting object/areas.

The camera controller may use machine learning to smart-capture features, for example to perform a detection of changes (e.g. with respect to a reference map.

According the various embodiments, the camera 301 has a video mode and a single image mode and the camera controller 302 switches the camera 301 to record a video if the vehicle (and thus the camera 301) is at a location with high relevance and to take one or more single images if the vehicle (and thus the camera 301) is at a location with low relevance.

The relevance of a location depends on the respective application (mapping, navigation, autonomous driving). A highly relevant location (e.g. for mapping) may for example be a city centre, a shopping area (e.g. a mall area), a highly populated area, an area with high traffic etc. The camera controller 302 may be configured to switch to video recording in such a location to get higher density data. Accordingly, on a rural country road the camera controller 302 may decrease the frequency of recording to single images to save battery life.

The camera controller 302 may determine the location as well as the relevancy of a location by means of the data source 305 which may for example include a positioning device as well as, for example, a map marking relevant areas. For example, an operator may transmit indications of relevant areas to the vehicle, where they are stored and used by the camera controller 302 for camera control.

Figure 4:
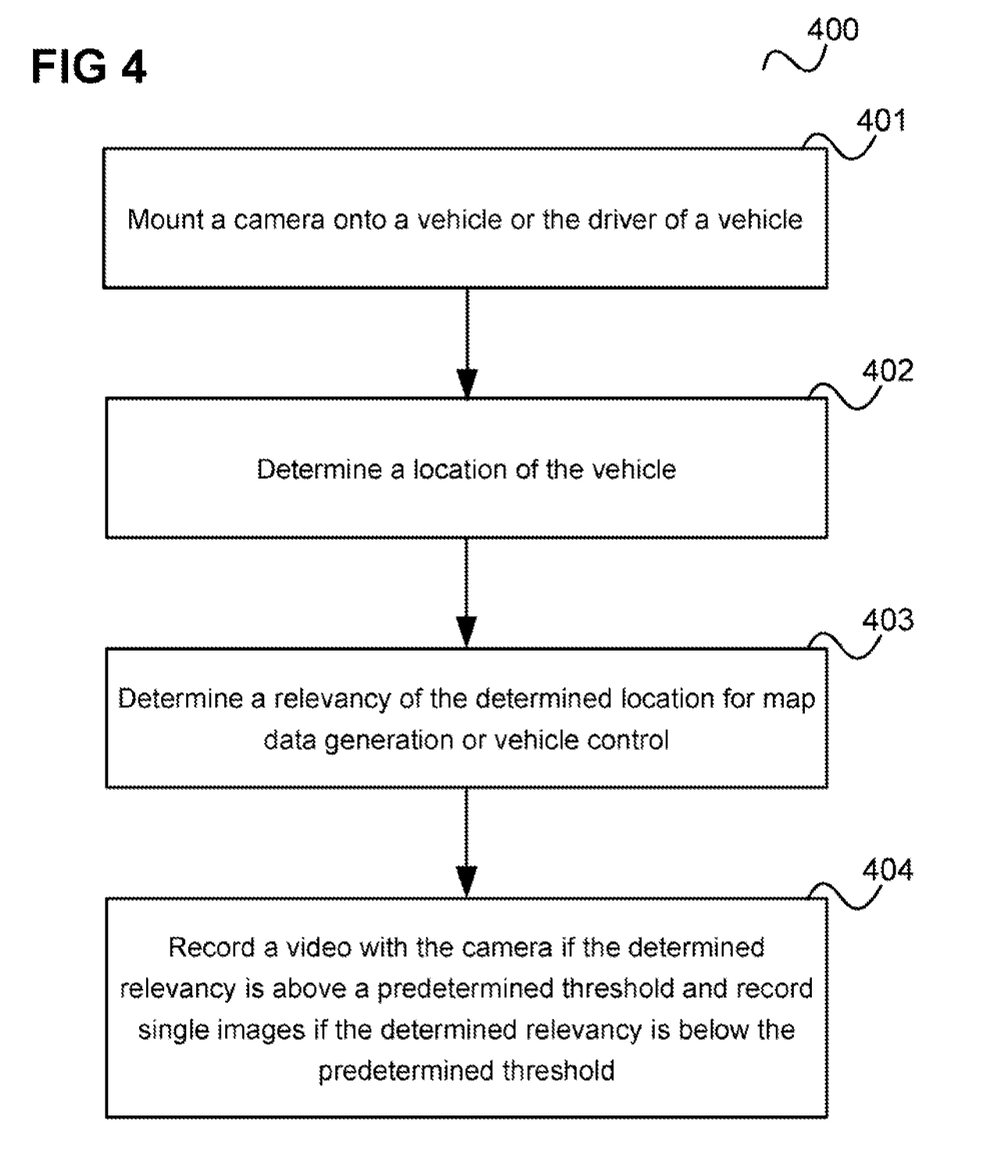
FIG. 4 shows a flow diagram illustrating a method for gathering image training data for training a machine learning model to detect features for vehicle navigation or vehicle control.

In summary, according to various embodiments, a method is provided as illustrated in 4.

FIG. 4 shows a flow diagram 400 illustrating a method for gathering image training data for training a machine learning model to detect features for vehicle navigation or vehicle control.

In 401, a camera is mounted onto a vehicle or the driver of a vehicle.

In 402, a location of the vehicle is determined.

In 403, a relevancy of the determined location for map data generation or vehicle control is determined.

In 404, a video is recorded with the camera if the determined relevancy is above a predetermined threshold and recording single images if the determined relevancy is below the predetermined threshold.

The method of FIG. 4 may be carried out by a corresponding image recording arrangement as it is, in one embodiment, shown in FIG. 3.

According to various embodiments, in other words, at highly relevant locations, pictures are taken in video mode while in less relevant locations, single images are taken.

The method may further comprise training a machine learning model using the recorded video (i.e. the video frames) and the single images. The machine learning model may be trained for a certain application (a vehicle control application such as for recognizing objects or a map data generation application) and the relevancy of a location may depend on the application.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for gathering image training data for training a machine learning model to detect features for vehicle navigation or vehicle control, comprising
   - mounting a camera onto a vehicle or the driver of a vehicle;
   - determining a location of the vehicle;
   - determining a relevancy of the determined location for map data generation or vehicle control; and
   - recording a video with the camera if the determined relevancy is above a predetermined threshold and recording single images if the determined relevancy is below the predetermined threshold.

2. The method of claim 1, wherein the relevancy is determined based on map data specifying whether location belongs to an urban area or a rural area.

3. The method of claim 2, wherein the relevancy is determined to be higher when the vehicle is located in an urban area and is determined to be lower when the vehicle is located in a rural area.

4. The method of claim 3, wherein the predetermined threshold is set such that the relevancy of an urban area is above the predetermined threshold and the relevancy of a rural area is below the predetermined threshold.

5. The method of claim 1, wherein the relevancy of a location is determined to be either high or low and the method comprises recording a video with the camera if the determined relevancy is high and recording single images if the determined relevancy is low.

6. The method of claim 1, wherein the camera comprises a video mode and a single image mode and the method comprises switching the camera to video mode if the determined relevancy is above the predetermined threshold and switching the camera to single image mode if the determined relevancy is below the predetermined threshold.

7. The method of claim 1, comprising setting a frame rate of the recording of the video or a rate of recording single images depending on the determined relevancy.

8. The method of claim 1, comprising determining the relevancy of the determined location depending on population density of the location, such that the determined relevancy is the higher the higher the population is at the location.

9. The method of claim 1, comprising determining the relevancy of the determined location depending on traffic at the location, such that the determined relevancy is the higher the higher the population is at the location.

10. The method of claim 1, comprising storing and uploading the recorded video or single images.

11. The method of claim 1, comprising storing the recorded video or single images, determining a value of the recorded video or single images for training the machine learning model and uploading the recorded video and single images if the value is above a predetermined threshold.

12. The method of claim 1, comprising storing the recorded video or single images and uploading the recorded video or single images to a remote component in response to the reception of a request for training data from the remote component.

13. The method of claim 10, comprising labelling the recorded video or single images with a specification of the determined location before uploading.

14. The method of claim 1, comprising determining the relevancy of the determined location by consulting relevancy data which indicates relevant areas.

15. An image recording arrangement of a vehicle comprising:
 a camera
 a positioning device configured to determine a location of the vehicle; and
 a camera controller configured to determine a relevancy of the determined location for map data generation or vehicle control and configured to control the camera to record a video if the determined relevancy is above a predetermined threshold and to record single images if the determined relevancy is below the predetermined threshold.

16. A non-transitory computer-readable medium comprising program instructions, which, when executed by one or more processors, cause the one or more processors to perform a method for gathering image training data for training a machine learning model to detect features for vehicle navigation or vehicle control, comprising:
 mounting a camera onto a vehicle or the driver of a vehicle;
 determining a location of the vehicle;
 determining a relevancy of the determined location for map data generation or vehicle control; and
 recording a video with the camera if the determined relevancy is above a predetermined threshold and recording single images if the determined relevancy is below the predetermined threshold.

* * * * *